(12) United States Patent
Escudero Rodriguez et al.

(10) Patent No.: US 10,892,678 B2
(45) Date of Patent: Jan. 12, 2021

(54) METHOD AND APPARATUS FOR BIDIRECTIONAL OPERATION OF PHASE-SHIFT FULL BRIDGE CONVERTER USING INDUCTOR PRE-CHARGING

(71) Applicant: Infineon Technologies Austria AG, Villach (AT)

(72) Inventors: Manuel Escudero Rodriguez, Villach (AT); Matteo-Alessandro Kutschak, Ludmannsdorf (AT); David Meneses Herrera, Villach (AT)

(73) Assignee: Infineon Technologies Austria AG, Villach (AT)

(*) Notice: Subject to any disclaimer, the term of this patent is extended or adjusted under 35 U.S.C. 154(b) by 0 days.

(21) Appl. No.: 15/672,657

(22) Filed: Aug. 9, 2017

(65) Prior Publication Data

US 2019/0052167 A1    Feb. 14, 2019

(51) Int. Cl.
*H02M 1/34* (2007.01)
*H02M 3/335* (2006.01)
*H02M 1/36* (2007.01)
*H02M 1/00* (2006.01)
*H02M 7/521* (2006.01)
*H02M 7/5387* (2007.01)

(52) U.S. Cl.
CPC .............. *H02M 1/34* (2013.01); *H02M 1/36* (2013.01); *H02M 3/33584* (2013.01);
(Continued)

(58) Field of Classification Search
CPC .............. H02M 1/34; H02M 3/33584; H02M 2001/0048; H02M 2001/344;
(Continued)

(56) References Cited

U.S. PATENT DOCUMENTS

| 6,452,815 B1* | 9/2002 | Zhu .................. H02M 1/34 363/17 |
| 7,196,914 B2 | 3/2007 | Ren et al. |

(Continued)

FOREIGN PATENT DOCUMENTS

JP    2014007942 A    1/2014

OTHER PUBLICATIONS

Unknown Author, "Bidirectional DC-DC Converter", Texas Instruments, TI Designs, TIDUAI7, Sep. 2015, pp. 1-79.
(Continued)

*Primary Examiner* — Shawki S Ismail
*Assistant Examiner* — Demetries A Gibson
(74) *Attorney, Agent, or Firm* — Murphy, Bilak & Homiller, PLLC

(57) ABSTRACT

A bidirectional phase-shift full bridge converter includes a primary side having switch devices forming a full-bridge power stage and a first inductor connected to the power stage, a secondary side having switch devices forming a power stage and a second inductor connected to that power stage, a transformer, and a controller for controlling switching of the switch devices to transfer energy from the primary to secondary side in a first mode, and to transfer energy from the secondary to primary side in a second mode. In the second mode, the controller controls switching of the switch devices to pre-charge the first inductor at, near or above a current level of the second inductor prior to transferring energy from the secondary to primary side, so that the current in the first inductor is at, near or above the current in the second inductor at the beginning of the energy transfer.

21 Claims, 11 Drawing Sheets

(52) U.S. Cl.
CPC ........ *H02M 3/33569* (2013.01); *H02M 7/521* (2013.01); *H02M 7/5387* (2013.01); *H02M 7/53871* (2013.01); *H02M 7/53875* (2013.01); *H02M 2001/0048* (2013.01); *H02M 2001/0058* (2013.01); *H02M 2001/344* (2013.01)

(58) Field of Classification Search
CPC ............. H02M 3/33569; H02M 7/521; H02M 7/5387; H02M 7/53871; H02M 7/53875
USPC ...................... 363/17, 98, 132; 323/223, 235
See application file for complete search history.

(56) References Cited

U.S. PATENT DOCUMENTS

| | | | |
|---|---|---|---|
| 2007/0025125 A1* | 2/2007 | Nakahori | H02M 3/3376 363/56.02 |
| 2009/0059622 A1* | 3/2009 | Shimada | H02M 1/32 363/17 |
| 2009/0086512 A1 | 4/2009 | Fahlenkamp et al. | |
| 2009/0244934 A1 | 10/2009 | Wang et al. | |
| 2011/0032731 A1* | 2/2011 | Coleman | H02M 1/4258 363/21.12 |
| 2012/0063175 A1 | 3/2012 | Wang et al. | |
| 2014/0334189 A1* | 11/2014 | Yan | H02M 3/33584 363/17 |
| 2015/0036390 A1 | 2/2015 | Ou et al. | |
| 2016/0181925 A1* | 6/2016 | Chiang | H02M 3/33584 363/17 |
| 2019/0245455 A1* | 8/2019 | Gudino Carrizales | H02M 3/33592 |

OTHER PUBLICATIONS

"PSFB Control Using C2000 Microcontrollers", Texas Instruments, Application Report, SPRABR1, May 2013.

* cited by examiner

METHOD AND APPARATUS FOR BIDIRECTIONAL OPERATION OF PHASE-SHIFT FULL BRIDGE CONVERTER USING INDUCTOR PRE-CHARGING

TECHNICAL FIELD

The present application relates to phase-shift full bridge converters, in particular a modulation scheme for bidirectional operation of phase-shift full bridge converters.

BACKGROUND

Bidirectional DC-DC converters are used in applications where bidirectional power flow may be required. For example, in hybrid electric vehicles and electric vehicles, bidirectional converters are used to charge a low-voltage (e.g. 12 V) battery during normal operation in buck (forward) mode, and charge or assist a high-voltage (e.g. 400 V/600 V) battery or bus in boost (reverse) mode like when a high-voltage battery has discharged to a very low energy or capacity level. One type of bidirectional DC-DC converter is a phase-shift full bridge converter. A phase-shift full bridge converter includes a full-bridge power stage on the primary (high-voltage) side, and a power stage such as a full-bridge or a current-fed push-pull stage on the secondary (low voltage) side. The primary and secondary sides are galvanically isolated from one another by a transformer. A controller provides closed-loop control for both directions of power flow.

Zero-voltage switching (ZVS) is preferred for phase-shift full bridge converters. With ZVS, switch turn-on and turn-off occurs at zero voltage. A phase-shift full bridge converter can achieve high efficiency, with low voltage stress for the switching devices in the forward (buck) mode of operation. However, when operated in the reverse (boost mode) direction, high voltage stress appears in the secondary-side switching devices.

In the phase-shift full bridge converter topology, an inductor is connected to the secondary-side power stage. This inductor functions as a choke as part of the output filter. A resonant inductor on the primary side (in conjunction with the output choke) is used to achieve zero-voltage transitions in the primary-side full-bridge power stage. When a phase-shift full bridge converter transfers energy from the secondary side to the primary side, the converter behaves as a boost converter where the inductor on the secondary-side acts as a boost inductor. The current in the boost inductor rises while shorted between the secondary potential and secondary ground, thereby storing energy. The boost inductor current decreases while shorted between the secondary and the primary potential, transferring the stored energy to the primary side. The secondary-side inductor becomes electrically connected in series with the primary-side resonant inductor the moment energy transfer begins from the secondary side to the primary side, and the secondary-side switch devices become electrically connected in parallel.

At that moment, the primary-side resonant inductor is discharged and opposes the flow of current from the secondary-side inductor, increasing the voltage in the secondary-side switch devices. This voltage can rise above the maximum allowed blocking voltage of the secondary-side switch devices, which can lead to damage or even device destruction. The secondary-side switch devices of a bidirectional phase-shift full bridge converter can be protected from the resonant-inductor-induced voltage overshoot with clamping or snubbing techniques. However, clamping and snubber circuits are lossy, and do not work function with the same performance when the converter operates in forward (buck) and reverse (boost) modes.

SUMMARY

According to an embodiment of a bidirectional phase-shift full bridge converter, the converter comprises: a primary side comprising switch devices that form a full-bridge power stage, and a first inductor connected to the primary-side full-bridge power stage; a secondary side comprising switch devices that form a power stage, and a second inductor connected to the secondary-side power stage; a transformer coupling the primary side and the secondary side; and a controller operable to control switching of the switch devices to transfer energy from the primary side to the secondary side in a first mode, and to transfer energy from the secondary side to the primary side in a second mode. In the second mode, the controller is operable to control switching of the switch devices to pre-charge the first inductor at, near or above a current level of the second inductor prior to transferring energy from the secondary side to the primary side, so that the current in the first inductor is at, near or above the current in the second inductor at the beginning of the energy transfer.

According to an embodiment of a method of operating a bidirectional phase-shift full bridge converter that includes a primary side comprising switch devices that form a full-bridge power stage and a first inductor connected to the primary-side full-bridge power stage, a secondary side comprising switch devices that form a power stage and a second inductor connected to the secondary-side power stage, and a transformer coupling the primary side and the secondary side, the method comprises: transferring energy from the primary side to the secondary side in a first mode; transferring energy from the secondary side to the primary side in a second mode; and in the second mode, pre-charging the first inductor at, near or above a current level of the second inductor prior to transferring energy from the secondary side to the primary side, so that the current in the first inductor is at, near or above the current in the second inductor at the beginning of the energy transfer.

According to an embodiment of a bidirectional phase-shift full bridge converter system, the system comprises: a primary side comprising switch devices that form a full-bridge power stage, a first inductor connected to the primary-side full-bridge power stage and a bulk capacitor connected to the primary-side full-bridge power stage; a secondary side comprising switch devices that form a power stage, and a second inductor connected to the secondary-side power stage; a transformer coupling the primary side and the secondary side; a voltage source coupled to the bulk capacitor; an energy storage device coupled to the secondary side; and a controller operable to control switching of the switch devices to transfer energy from the voltage source to the secondary side via the transformer to charge the energy storage device in a first mode, and to transfer energy from the energy storage device to the primary side via the transformer to charge the bulk capacitor in a second mode. In the second mode, the controller is operable to control switching of the switch devices to discharge energy from the bulk capacitor to pre-charge the first inductor at, near or above a current level of the second inductor prior to transferring energy from the secondary side to the primary side, so that the current in the first inductor is at, near or above the current in the second inductor at the beginning of the energy transfer.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Embodiments described herein provide a new modulation scheme for bidirectional phase-shift full bridge converters in which induced voltage overshoot in the reverse direction (boost mode) is mitigated, allowing for ZVS operation in both forward and reverse directions.

Figure 1:
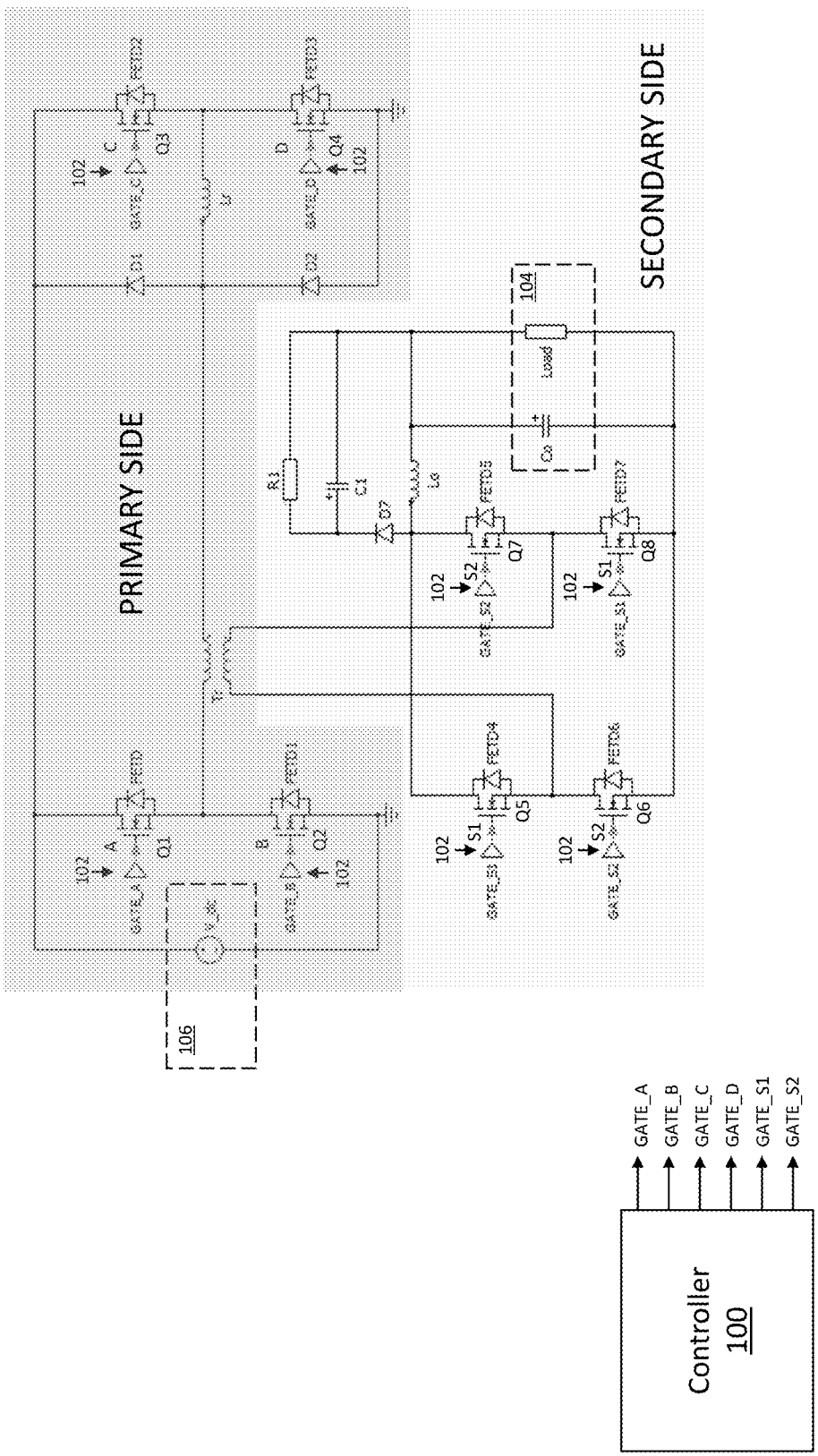
FIGS. 1 and 2 illustrate schematic diagrams of an embodiment of a bidirectional phase-shift full bridge converter in different modes of operation.
Figure 2:
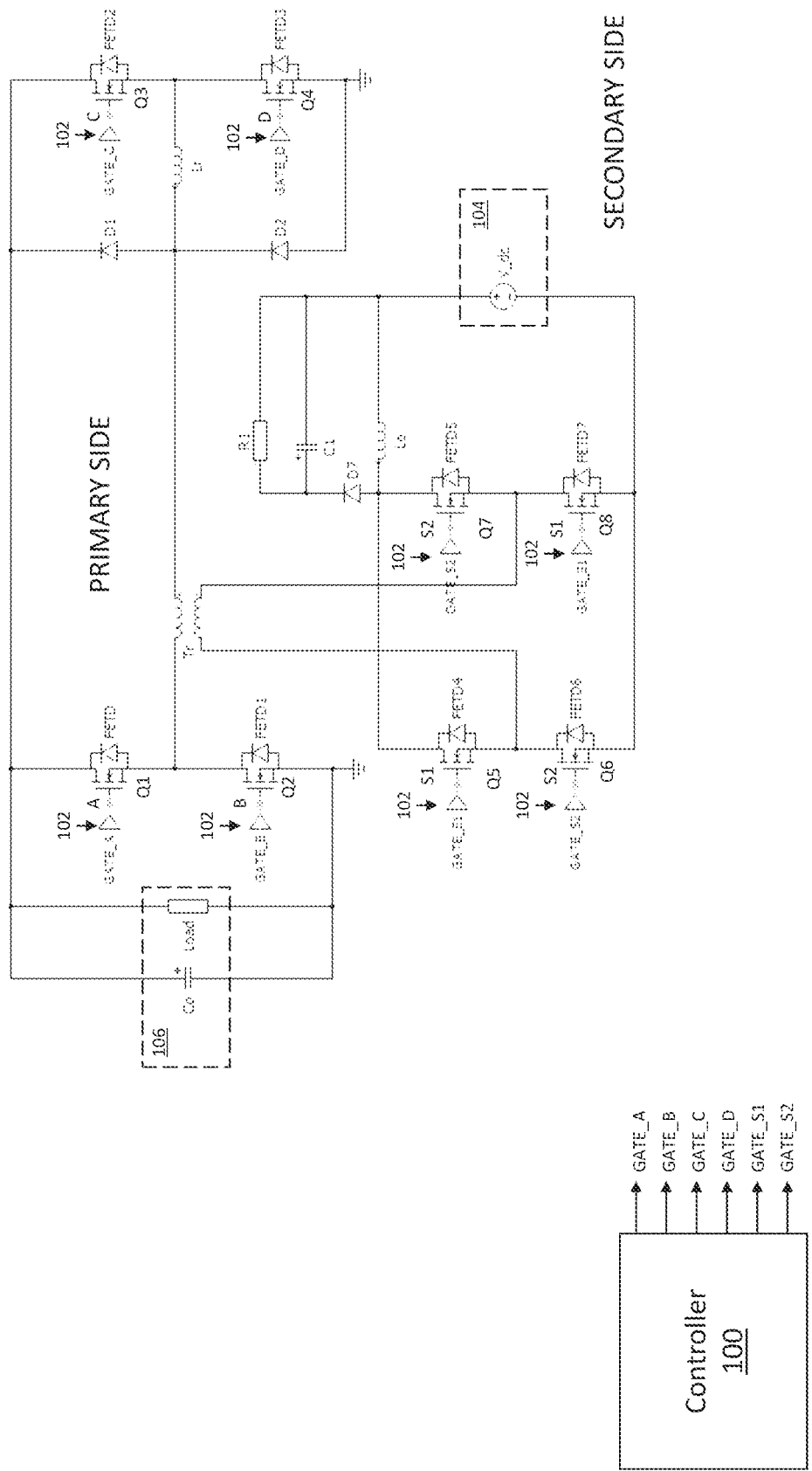

FIGS. 1 and 2 illustrate an embodiment of a bidirectional phase-shift full bridge converter. FIG. 1 shows the converter in the forward direction (buck mode), and FIG. 2 shows the converter in the reverse direction (boost mode). Forward direction means that energy is transferred from the primary side to the secondary side. Reverse direction means that energy is transferred from the secondary side to the primary side. Hence, the converter is bidirectional. The terms 'buck mode' and 'forward direction' are used synonymously herein, as are the terms 'boost mode' and 'reverse direction'.

The primary side of the bidirectional phase-shift full bridge converter has switch devices Q1 through Q4 that form a full-bridge power stage and a resonant inductor Lr connected to the primary-side full-bridge power stage. The secondary side of the converter has switch devices Q5 through Q8 that form a power stage such as a full-bridge, a current-fed push-pull, a center-taped stage, etc. and a choke inductor Lo connected to the secondary-side power stage. Operation of the bidirectional phase-shift full bridge converter is described herein in the context of a full-bridge power stage on both sides of the converter, each full-bridge stage having two branches, and each branch having a pair of series-connected power transistors. On the primary side, one branch includes high-side switch device Q1 connected in series with low-side switch device Q2 and the other branch includes high-side switch device Q3 connected in series with low-side switch device Q4. Similarly on the secondary side, one branch includes high-side switch device Q5 connected in series with low-side switch device Q6 and the other branch includes high-side switch device Q7 connected in series with low-side switch device Q8. However, those skilled in the art will readily understand that a different type of secondary-side power stage can used such as, but not limited to, a current-fed push-pull or a center-taped stage. In general, any type of power stage that can be used as a synchronous rectifier in the forward direction (buck mode) and a boost stage in the reverse direction (boost mode) can be used without departing from the intended scope of the modulation embodiments described herein.

Regardless of the type of power stage on the secondary side, a transformer Tr couples the primary side and the secondary side of the converter. A controller 100 is provided for generating PWM (pulse width modulation) signals GATE_A through GATE_S2 for controlling switching of the respective switch devices Q1 through Q8 to transfer energy from the primary side to the secondary side in forward (buck) mode, and to transfer energy from the secondary side to the primary side in reverse (boost) mode. Driver circuitry 102 drives the gates of the switch devices Q1 through Q8 with a gate voltage A through S2 in response to the corresponding PWM signal GATE_A through GATE_S2.

The switch devices Q1 through Q8 of the bidirectional phase-shift full bridge converter are shown as power MOSFETs in FIGS. 1 and 2. However, any suitable power transistor can be used for the switch devices Q1 through Q8 of the converter, such as but not limited to power MOSFETs, IGBTs (insulated gate bipolar transistors), HEMTs (high-electron mobility transistors), etc. The primary-side resonant inductor Lr and/or the secondary-side choke inductor Lo can be realized as discrete external inductors, or as stray or leakage inductances from other elements (e.g. the transformer Tr) of the converter.

When the bidirectional phase-shift full bridge converter operates in the forward direction (FIG. 1), an energy storage device 104 such as a battery, bulk capacitor, etc. on the secondary side is charged by transferring energy from the primary side. The energy storage device 104 on the secondary side is shown as a load coupled in parallel with a capacitor Co in FIG. 1, since FIG. 1 illustrates the converter in buck mode.

When the bidirectional phase-shift full bridge converter operates in the reverse direction (FIG. 2), energy in the secondary-side energy storage device 104 is transferred to the primary side to charge or assist a high-voltage energy storage device or bus 106 on the primary side. The high-voltage energy storage device/bus 106 on the primary side is shown as a load coupled in parallel with a capacitor Co in FIG. 2, since FIG. 2 illustrates the converter in boost mode.

In boost mode when the converter operates in the reverse direction, the controller 100 controls switching of the switch devices Q1 through Q8 to pre-charge the resonant inductor Lr on the primary side at, near or above a current level of the choke inductor Lo on the secondary side prior to transferring energy from the secondary side to the primary side. Accordingly, the current in the primary-side resonant inductor Lr is at, near or above the current in the secondary-side choke inductor Lo at the beginning of each energy transfer in boost mode.

Figure 3:
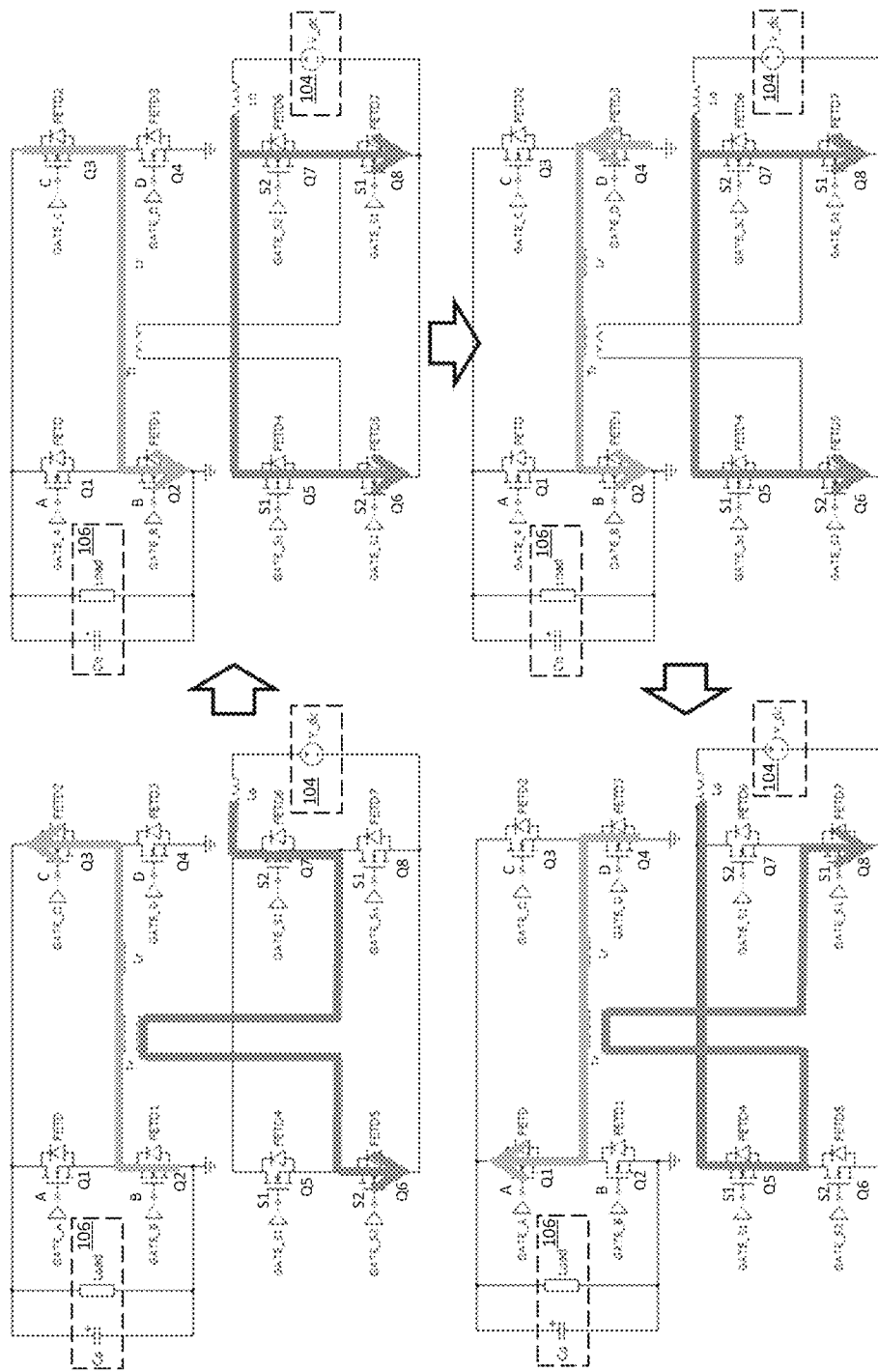
FIG. 3 illustrates operation of the bidirectional phase-shift full bridge converter over one complete power transfer cycle in boost mode.

FIG. 3 illustrates operation of the bidirectional phase-shift full bridge converter over one complete power transfer cycle in the reverse direction during boost mode, according to an embodiment. In the reverse direction, the secondary-side choke inductor Lo operates as a boost inductor. More particularly, the secondary-side choke inductor Lo is charged when shorted to ground by the secondary-side switches Q5 through Q8 and discharged when connected to the primary side, transferring power.

The upper left-hand illustration in FIG. 3 shows a positive power transfer interval initiated by the controller 100 by turning on high-side switch device Q6 and low-side switch device Q7 in opposite branches of the secondary-side power stage, and by turning on high-side switch device Q3 and low-side switch device Q2 in opposite branches of the primary-side power stage. With this switch device configuration, the secondary-side choke inductor Lo is electrically connected in series with the primary-side resonant inductor Lr, and energy is transferred from the secondary-side energy storage device 104 to the primary side through the transformer Tr.

The upper right-hand illustration in FIG. 3 shows a pre-charge interval between the positive transfer interval and the subsequent negative power transfer interval for the same power transfer cycle. Use of the terms 'positive transfer interval' and 'negative transfer interval' is intended to indicate that the voltage polarity across the primary and secondary windings of the transformer Tr depends on the current flow direction within the secondary side in boost mode i.e. when the converter operates in the reverse direction. The controller 100 is aware of the changing voltage polarity, and controls the turn on/off state of the primary-side switch devices Q1 through Q4 accordingly to ensure proper charging of the energy storage device/bus 106 on the primary side in boost mode.

The controller 100 initiates the pre-charge interval by turning on each switch device Q5 through Q8 of the secondary-side power stage and high-side switch device Q3 and low-side switch device Q2 in opposite branches of the primary-side full-bridge power stage at the same time. With this switch device configuration, the primary-side resonant inductor Lr is pre-charged at, near or above the current level of the secondary-side choke inductor. This way, the primary-side resonant inductor Lr is induced with a current of approximately equal or higher value than the current that will appear through the resonant inductor Lr during the subsequent negative power transfer interval (lower left-hand illustration in FIG. 3). At the start of the negative power transfer interval, the current level of the primary-side resonant inductor Lr already is at the approximately same or higher level than the current in the secondary-side choke inductor Lo. Accordingly, the primary-side resonant inductor Lr does induces little or no voltage overshoot on the secondary-side switch devices Q5 through Q8 because of the reduced di/dt at the moment of electrically connecting the resonant inductor Lr and the choke inductor Lo in series.

The lower right-hand illustration in FIG. 3 shows a freewheel interval which occurs immediately after the pre-charge interval between the positive and negative power transfer intervals. The controller 100 initiates the freewheel interval by turning on each switch device Q5 through Q8 of the secondary-side power stage and either each low-side switch device Q2/Q4 or each high-side switch device Q1/Q3 in the branches of the primary-side full-bridge power stage at the same time. With this switch device configuration, the current in the primary-side resonant inductor Lr freewheels on the primary side. Also, the secondary-side choke inductor Lo continues being energized like a boost converter prior to the subsequent negative energy transfer interval.

Figure 4:
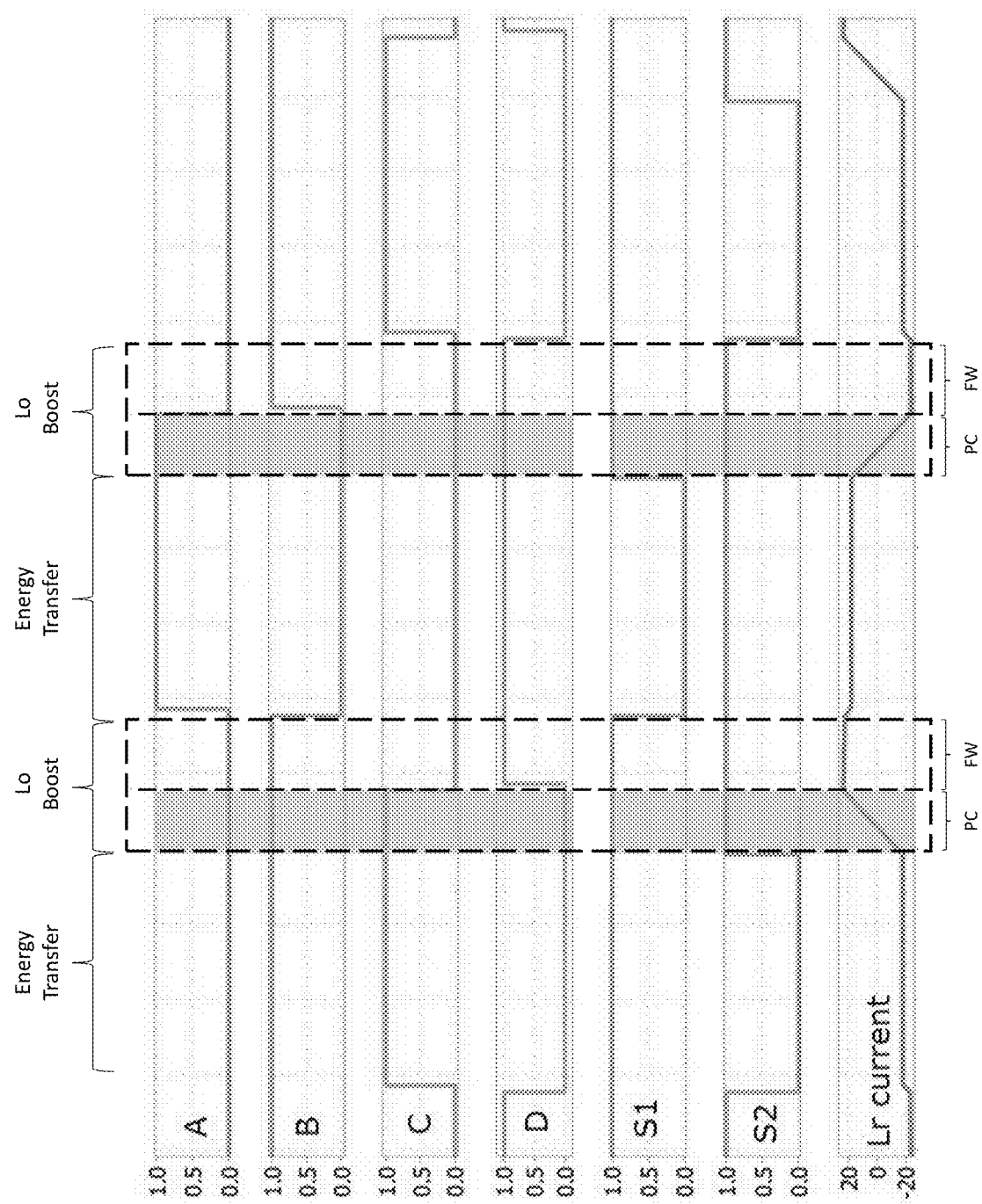
FIG. 4 illustrates an embodiment of the modulation scheme implemented by the bidirectional phase-shift full bridge converter in boost mode, and the corresponding current in the primary-side resonant inductor.

FIG. 4 illustrates an embodiment of the modulation scheme for controlling the converter switch devices Q1 through Q8 in boost mode, and the corresponding current ('Lr current') in the primary-side resonant inductor L2. As shown in FIGS. 1 and 2, one pair of high-side and low-side switch devices in opposite branches of the secondary-side power stage is controlled by one of the PWM signals (via gate signal S1/S2), and the other pair of high-side and low-side switch devices is controlled by the complementary PWM signal (via gate signal S2/S1). An energy transfer interval occurs when one PWM signal is high (active) and the complimentary PWM signal is low (inactive). Under these secondary-side switch conditions and with the primary-side switch devices controlled as shown in either the top-left or bottom-left illustration in FIG. 3, energy is transferred from the secondary side to the primary side during the intervals labelled 'Energy Transfer' in FIG. 4.

The secondary-side choke inductor Lo is energized between the energy transfer intervals during the 'Lo Boost' intervals labelled in FIG. 4. To enter initiate an 'Lo Boost' interval, the controller 100 sets both PWM signals high at the same time so that S1=S2=high. When both PWM signals are high at the same time, current flows in the secondary-side choke inductor Lo but no energy is transferred to the primary side. During the beginning part of the 'Lo Boost' interval, the controller 100 also turns on a high-side switch device (Q1 or Q3) and a low-side switch device (Q4 or Q2) in opposite branches of the primary-side full-bridge power stage at the same time as shown in the top-right illustration in FIG. 3 (e.g. B=C=high or A=D=high). Under these switch conditions, the converter enters the pre-charge interval ('PC') and the primary-side resonant inductor Lr is pre-charged at, near or above the current level of the secondary-side choke inductor Lo.

Immediately after the pre-charge interval, the controller 100 turns on either each low-side switch device (Q2 and Q4) or each high-side switch device (Q1 and Q3) in the branches of the primary-side full-bridge power stage at the same time while each secondary-side switch device Q5 through Q8 is still on. Under these switch conditions, the converter enters the freewheel interval ('FW') and the current in the primary-side resonant inductor Lr freewheels on the primary side. Also, the secondary-side choke inductor Lo continues to be energized. As shown in FIG. 4, the primary-side resonant inductor Lr is positively or negatively pre-charged before each energy transfer interval, so that the current level ('Lr current' in FIG. 4) of the primary-side resonant inductor Lr already is at the approximately same or higher level than the current in the secondary-side choke inductor Lo, and therefore the primary-side resonant inductor Lr induces little or no voltage overshoot on the secondary-side switch devices Q5 through Q8 in boost mode.

Figure 5:
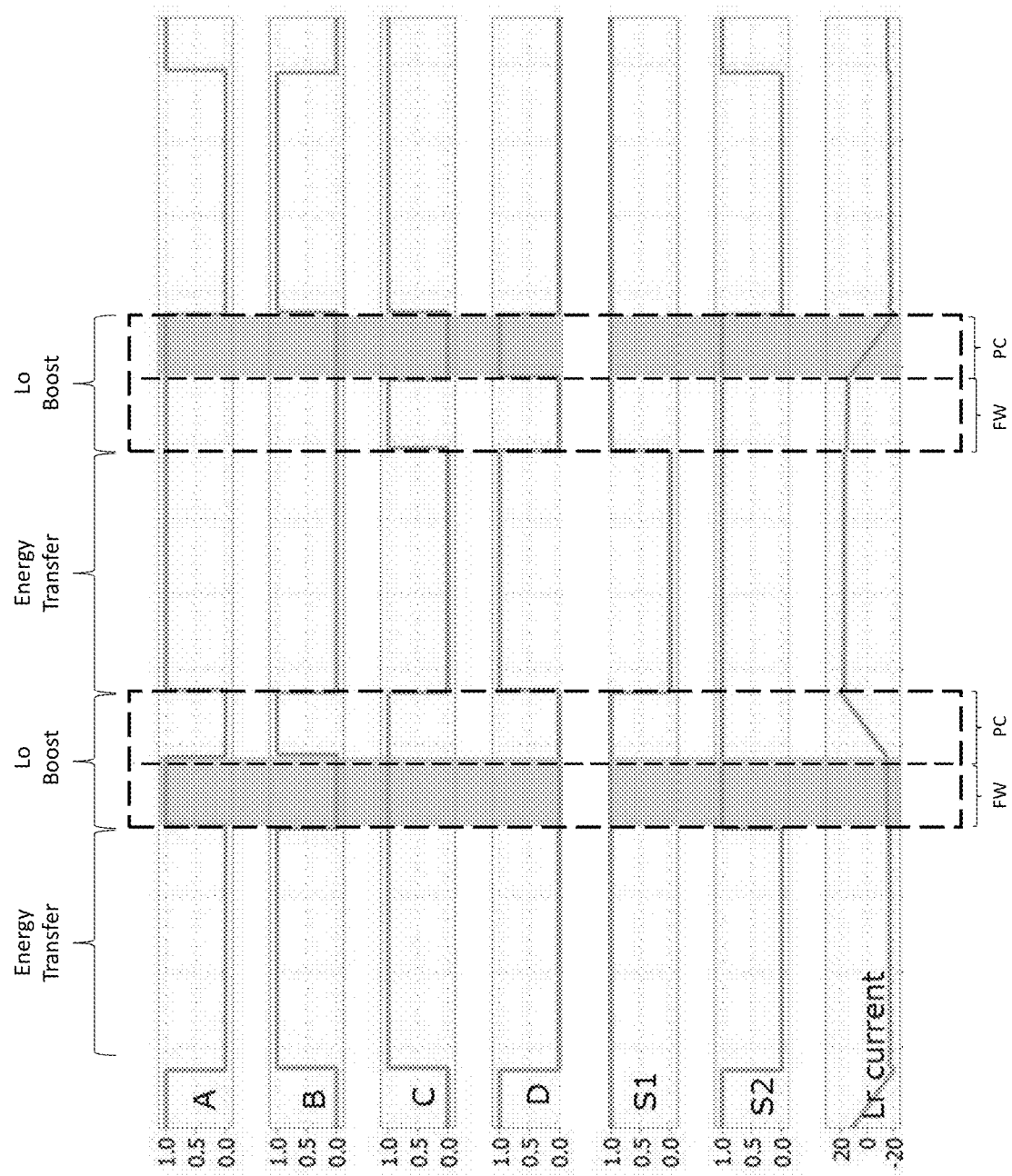
FIG. 5 illustrates another embodiment of the modulation scheme implemented by the bidirectional phase-shift full bridge converter in boost mode, and the corresponding current in the primary-side resonant inductor.

FIG. 5 illustrates another embodiment of the modulation scheme for controlling the converter switch devices Q1 through Q8 in the reverse direction, and the corresponding current ('Lr current') in the primary-side resonant inductor. According to this embodiment, the freewheel interval ('FW') occurs immediately before the pre-charge interval ('PC') between the positive and negative power transfer intervals ('Energy Transfer'). According to this embodiment, the converter enters the freewheel interval when the controller turns on each switch device Q5 through Q8 of the secondary-side power stage (S1=S2=high) and turning on either each low-side switch device Q2, Q4 (B=D=high and A=C=low) or each high-side switch device Q1, Q3 (B=D=low and A=C=high) in the branches of the primary-side full-bridge power stage at the same time to freewheel the current in the resonant inductor Lr on the primary side.

In either case, the modulation scheme yields zero voltage switching (ZVS) for all switch devices Q5 through Q8 on the secondary side in boost mode when the converter is operating in the reverse direction, since the modulation scheme ensures that the primary-side resonant inductor Lr is pre-charged at least to an energy level required to charge or discharge the output capacitance of the primary-side switch devices Q1 through Q4. More particularly, the primary-side resonant inductor Lr is pre-charged to an energy level required to charge the output capacitance of each high-side switch device Q1, Q3 of the primary-side full-bridge power stage prior to positive power transfer intervals in the reverse direction. Conversely, the primary-side resonant inductor Lr is pre-charged to an energy level required to discharge the output capacitance of each low-side switch device Q2, Q4 of the primary-side full-bridge power stage prior to negative power transfer intervals. Accordingly, the primary-side resonant inductor Lr does induces little or no voltage overshoot on the secondary-side switch devices Q5 through Q8 because of the reduced di/dt at the moment of electrically connecting the resonant inductor Lr and the choke inductor Lo in series (at the falling edge of gate signals S1 and S2).

FIG. 1 shows an embodiment of the bidirectional phase-shift full bridge converter in which the primary side includes clamping diodes D1 and D2. The clamping diodes D1 and D2 aid in clamping the maximum voltage in the switch devices Q5 through Q8 of the secondary side when the converter operates in the forward direction, thereby reducing voltage overshoot at the secondary-side switch devices Q5 through Q8 in boost mode.

Figure 6:
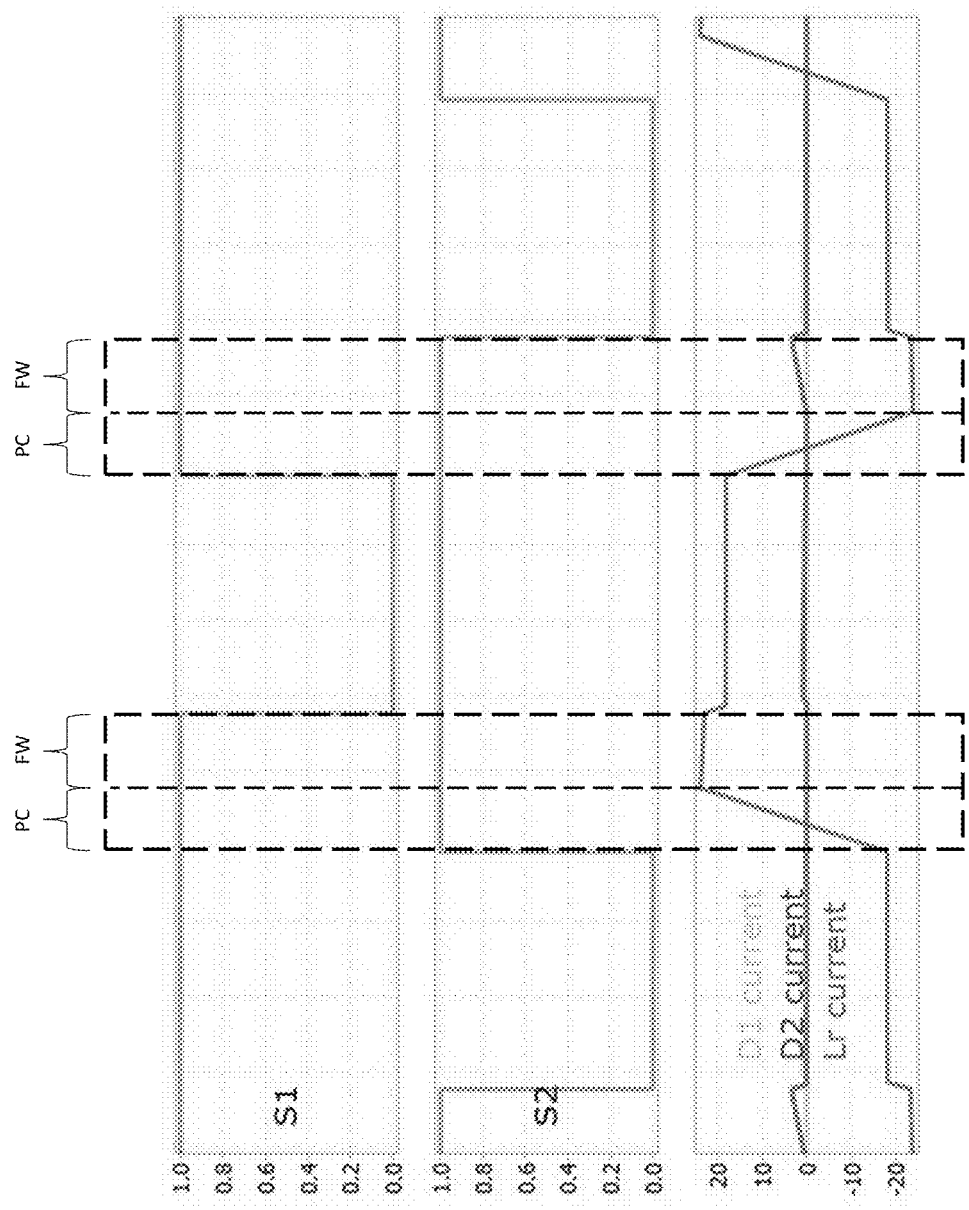
FIG. 6 illustrates clamping diode current and resonant inductor current on the primary side of the bidirectional phase-shift full bridge converter in boost mode.

FIG. 6 illustrates the current through clamping diode D1 ('D1 current'), the current through clamping diode D2 ('D2 current') and the current in the resonant inductor Lr ('Lr current') on the primary side when the converter operates in the reverse direction. For the modulation scheme described herein, the primary-side resonant inductor Lr is pre-charged at, near or above the current in the secondary-side choke inductor Lo at the beginning of each energy transfer interval, offering a lower resistive path than the clamping diodes D1, D2 when pre-charged in the reverse direction during boost mode.

Figure 7:
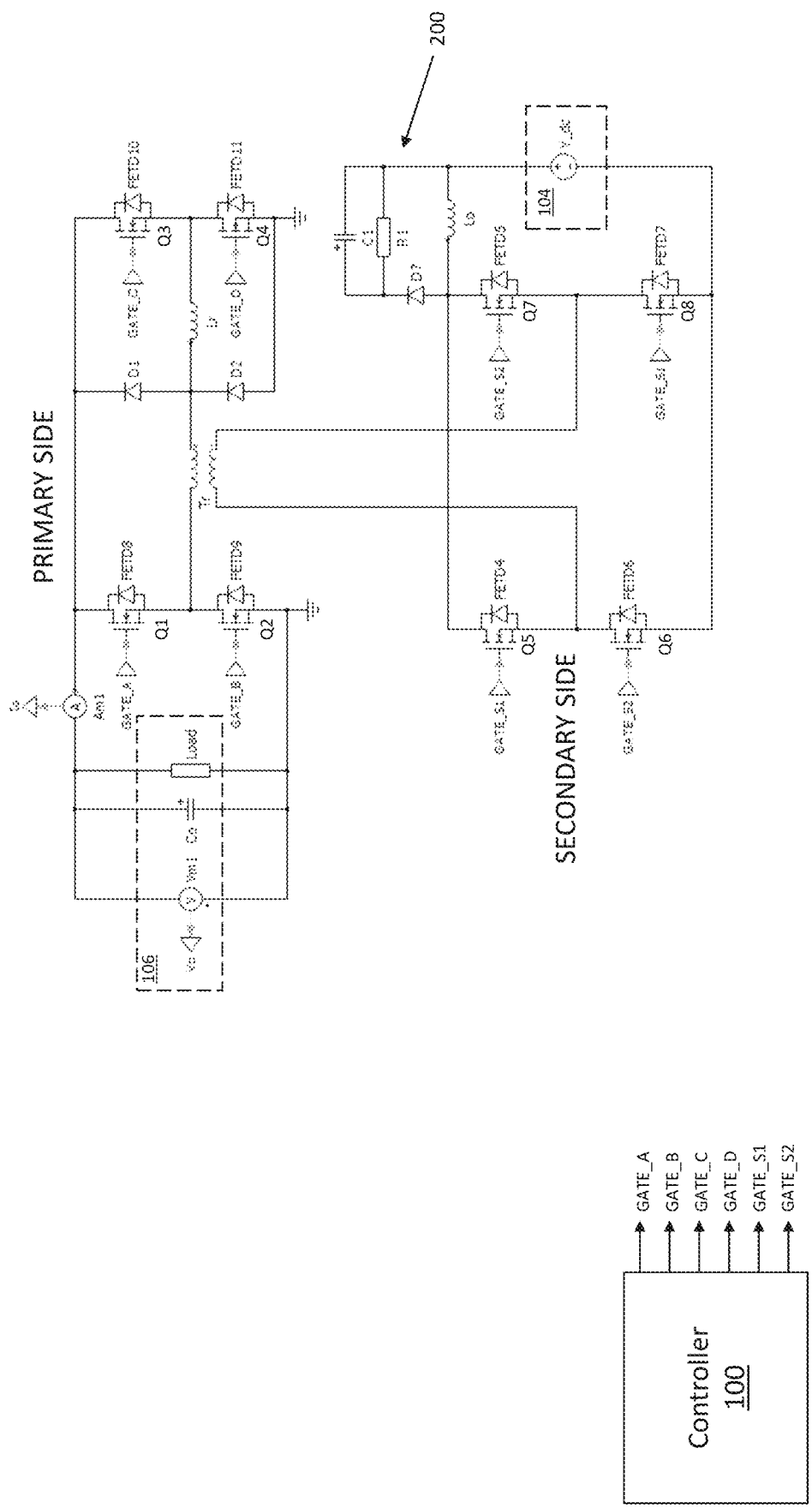
FIG. 7 illustrates a schematic diagram of an embodiment of the bidirectional phase-shift full bridge converter with a passive snubber circuit on the secondary side.

FIG. 7 illustrates an embodiment of the bidirectional phase-shift full bridge converter of FIGS. 1 and 2, modified with a passive snubber circuit 200 in parallel to the switch devices Q5 through Q8 or the choke inductor Lo on the secondary side. The passive snubber circuit 200 clamps the voltage overshoot with capacitor C1 and dissipates the energy through resistor R1 via diode D7. The passive snubber circuit 200 can operate in both directions of power flow, forward and reverse.

Figure 8:
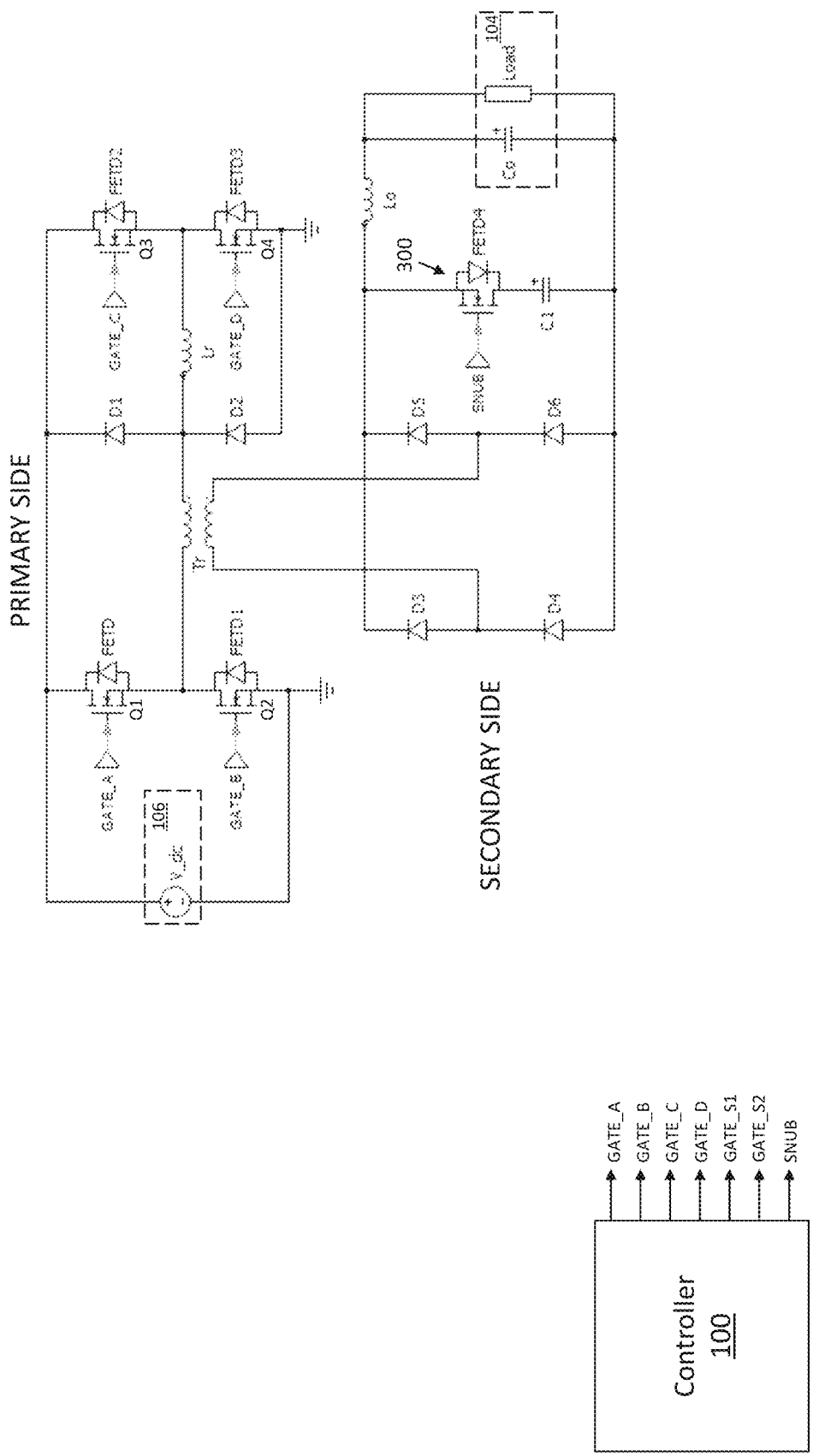
FIG. 8 illustrates a schematic diagram of an embodiment of the bidirectional phase-shift full bridge converter with an active snubber circuit on the secondary side.

FIG. 8 illustrates another embodiment of the bidirectional phase-shift full bridge converter of FIGS. 1 and 2, modified with an active snubber circuit 300 in parallel to the switch devices Q5 through Q8 on the secondary side (shown configured as diodes in FIG. 8). In FIG. 8, the secondary-side power switch devices Q5 through Q8 are shown configured as diodes D3 through D6 for ease of illustration only (the power stage formed by the secondary-side power switch devices Q5 through Q8 functions as a synchronous rectifier in the forward direction). The active snubber circuit 300 clamps the voltage overshoot via capacitor C1 and returns back the stored energy during the freewheeling interval. Unlike the passive snubber circuit of FIG. 7, active device FETD4 controls the amount of energy transferred and dissipated by the active snubber circuit 300 in response to a control signal SNUB generated by the controller 100.

The snubber circuits 200, 300 shown in FIGS. 7 and 8 reduce voltage overshoot resulting from the secondary-side switch devices Q5 through Q8 resonating with leakage and stray inductances at the start of a power transfer interval. The output capacitance of the secondary-side switch devices Q5 through Q8 resonates with the leakage and stray inductances at the start of a power transfer interval. The output capacitance of one of the secondary-side branches is charged when going from a conductive to a blocking state. The clamping diodes D1, D2 on the primary side cannot clamp this resonance. The snubber circuits 200, 300 shown in FIGS. 7 and 8 reduce voltage overshoot resulting from the secondary-side switch devices Q5 through Q8 resonating with leakage and stray inductances at the start of a power transfer interval. Only energy from the leakage and stray inductances which induces the voltage overshoot is dissipated through the snubber circuits 200, 300 in the reverse direction during boost mode, reducing power losses.

Figure 9:
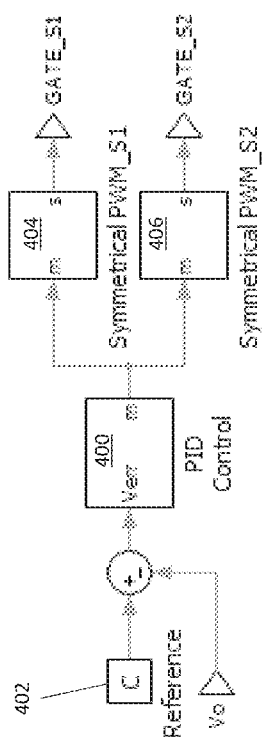
FIG. 9 illustrates a schematic diagram of an embodiment of a voltage control loop implemented by the converter controller in boost mode.
Figure 10:
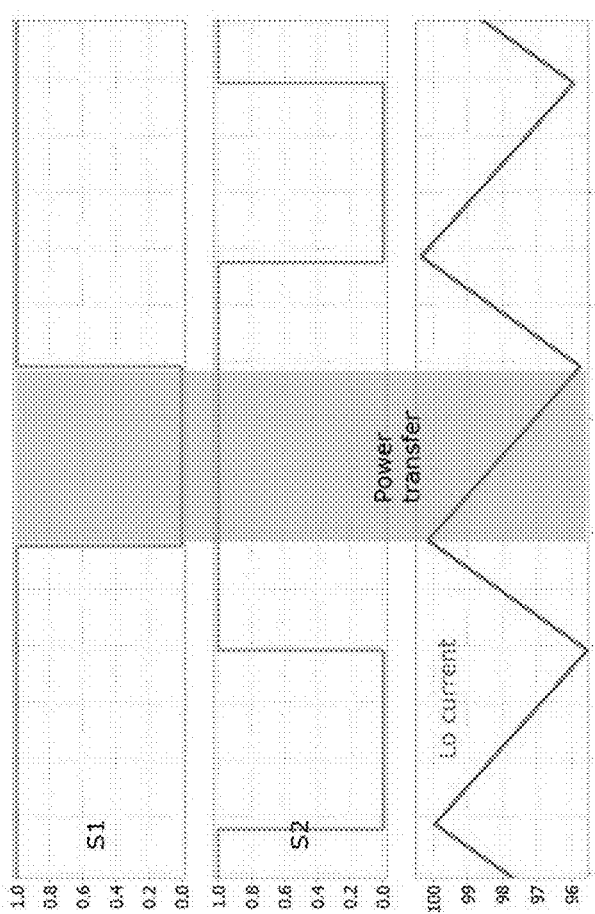
FIG. 10 illustrates secondary-side PWM control signals and corresponding choke inductor current on the secondary side of the bidirectional phase-shift full bridge converter in boost mode.

FIG. 9 illustrates an embodiment of a voltage control loop implemented by the converter controller 100 for boost mode operation. The voltage control loop includes a PID (proportional-integral-derivative) controller 400. The PID controller ('PID Control') 400 calculates an error value Verr based on the difference between a desired setpoint ('Reference') 402 and the measured output voltage Vo at the primary side, and applies a correction m based on proportional, integral and/or derivative terms. Respective PWM circuits ('Symmetrical PWM_S1', 'Symmetrical PWM_S2') 404, 406 generate the respective gate signals GATE_S1, GATE_S2 used to drive the corresponding secondary-side switch devices Q5 through Q8, based on the output m of the PID controller 400. When the bidirectional phase-shift full bridge converter operates in the reverse direction, as a boost converter, transferred power from the secondary side to the primary side depends on the overlap between the secondary-side switch device gate driving signals S1, S2. The longer the overlap, the higher the power delivered. During overlap between S1 and S2, the choke inductor Lo on the secondary side is shorted to ground and charged. When one of the branches in the secondary-side power stage is turned off, the stored energy in the choke inductor Lo is transferred to the primary side as shown in FIG. 10.

Figure 11:
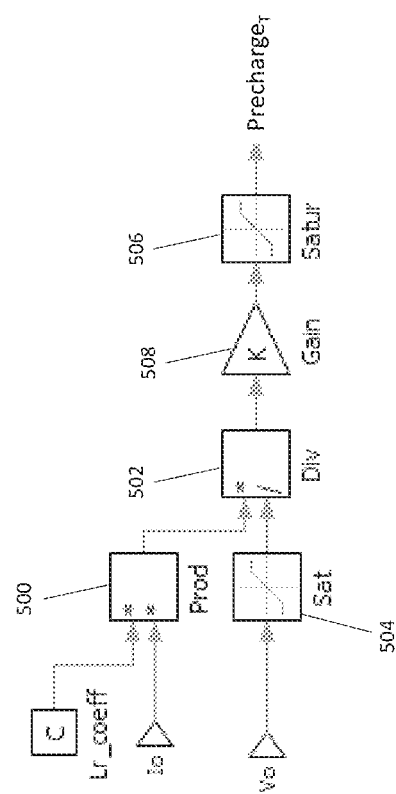
FIG. 11 illustrates a schematic diagram of an embodiment of a circuit included in or associated with the converter controller, for calculating the pre-charge time in boost mode.

FIG. 11 illustrates an embodiment of a circuit included in or associated with the converter controller 100, for calculating the pre-charge time in the reverse direction during boost mode. For the modulation scheme described herein, energy stored in the primary-side bulk capacitor Co is used to pre-charge the primary-side resonant inductor Lr. The pre-charge time depends on the value Lr_coeff of the primary-side resonant inductor Lr (including leakage and stray inductances), the value Io of the target pre-charge current (the current through Lr during a power transfer interval), and the voltage Vo across the primary-side bulk capacitor Co. The pre-charge time is given by:

$$Precharge_T = \frac{L_r * I_o}{V_o} \tag{1}$$

The pre-charge time calculation circuit includes circuitry ('Prod') 500 for calculating Lr*Io, circuitry ('Div') 502 for calculating Lr*Io/Vo, pre- and post-filter circuitry ('Sat', 'Satur') 504, 506, and gain circuitry ('Gain') 508.

The maximum pre-charge time is limited to the time between power transfers, e.g. as shown in FIG. 4. This time, as previously described herein, corresponds to the duty of the converter in boost mode operation. During the remaining time between power transfers, the current in the primary-side resonant inductor Lr is forced to freewheel through the high-side Q1/Q3 or low-side Q2/Q4 switch devices on the primary side. Forcing the current to freewheel in this way allows the converter to achieve ZVS transitions of the switch devices Q1 through Q8 at the beginning of a power transfer interval.

In an alternative implementation of the modulation scheme, the transition of the primary-side full-bridge power stage at the beginning of the freewheeling stage can be hard switched or hard commutated when using devices with an embedded body diode (e.g. diodes FETD through FET7 in FIGS. 1 and 2). The sequence order during the time between power transfer intervals is altered in that pre-charging follows freewheeling, and freewheeling follows a power transfer interval, e.g. as shown in FIG. 5. Current in the primary-side resonant inductor Lr can be freewheeled through the high-side Q1/Q3 or low-side Q2/Q4 switch devices on the primary side.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A bidirectional phase-shift full bridge converter, comprising:
a primary side comprising switch devices that form a full-bridge power stage, and a first inductor connected to the primary-side full-bridge power stage;
a secondary side comprising switch devices that form a power stage, and a second inductor connected to the secondary-side power stage;
a transformer coupling the primary side and the secondary side; and
a controller operable to control switching of the switch devices to transfer energy from the primary side to the secondary side in a first mode, and to transfer energy from the secondary side to the primary side in a second mode,
wherein in the second mode, the controller is operable to switch the switch devices on the primary side and on the secondary side in a defined sequence so as to pre-charge the first inductor and to energize the second inductor prior to an energy transfer from the secondary side to the primary side.

2. The bidirectional phase-shift full bridge converter of claim 1, wherein between power transfers from the secondary side to the primary side in the second mode, the controller is operable to turn on each switch device of the secondary-side power stage to energize the second inductor and a high-side switch device and a low-side switch device in opposite branches of the primary-side full-bridge power stage at the same time to pre-charge the first inductor at or above a current level that induces little or no voltage overshoot on the switch devices of the secondary-side power stage.

3. The bidirectional phase-shift full bridge converter of claim 2, wherein immediately after pre-charging the first inductor between power transfers from the secondary side to the primary side in the second mode, the controller is operable to turn on either each low-side switch device or each high-side switch device in the branches of the primary-side full-bridge power stage at the same time to freewheel the current in the first inductor on the primary side.

4. The bidirectional phase-shift full bridge converter of claim 2, wherein immediately before pre-charging the first inductor between power transfers from the secondary side to the primary side in the second mode, the controller is operable to turn on either each low-side switch device or each high-side switch device in the branches of the primary-side full-bridge power stage at the same time to freewheel the current in the first inductor on the primary side.

5. The bidirectional phase-shift full bridge converter of claim 1, wherein in the second mode, the controller is operable to control switching of the switch devices to pre-charge the first inductor to an energy level required to charge the output capacitance of each high-side switch device of the primary-side full-bridge power stage prior to first power transfer intervals and to discharge the output capacitance of each low-side switch device of the primary-side full-bridge power stage prior to second power transfer intervals of the opposite polarity as the first power transfer intervals.

6. The bidirectional phase-shift full bridge converter of claim 1, wherein the primary side further comprises clamping diodes configured to clamp the maximum voltage in the switch devices of the secondary side, and wherein the first inductor provides a lower resistive path than the clamping diodes when pre-charged in the second mode.

7. The bidirectional phase-shift full bridge converter of claim 1, wherein the secondary side further comprises a snubber circuit configured to reduce voltage overshoot resulting from the switch devices of the secondary side resonating with leakage and stray inductances at the start of a power transfer, and wherein only energy from the leakage and stray inductances which induces the voltage overshoot is dissipated through the snubber circuit in the second mode.

8. The bidirectional phase-shift full bridge converter of claim 1, wherein between power transfers from the secondary side to the primary side in the second mode, the controller is operable to control switching of the switch devices to pre-charge the first inductor to an energy level which ensures zero-voltage switching of the switch devices at the beginning of the power transfers.

9. The bidirectional phase-shift full bridge converter of claim 1, wherein each power transfer cycle in the second mode includes a power transfer interval during which energy is transferred from the secondary side to the primary side, a freewheeling interval following the power transfer interval and during which current in the first inductor freewheels on the primary side, and a pre-charge interval following the freewheeling interval, and wherein the controller is operable to turn on each switch device of the secondary-side power stage and a high-side switch device and a low-side switch device in opposite branches of the primary-side full-bridge power stage at the same time during the pre-charge interval to pre-charge the first inductor at or above a current level that induces little or no voltage overshoot on the switch devices of the secondary-side power stage.

10. The bidirectional phase-shift full bridge converter of claim 1, wherein the controller is further operable such that the control switching of the switch devices to pre-charge the first inductor is performed during a pre-charge interval preceding the energy transfer, and the current in the first inductor at the end of the pre-charge interval is at or above a current level of the first inductor during the energy transfer.

11. A method of operating a bidirectional phase-shift full bridge converter that includes a primary side comprising switch devices that form a full-bridge power stage and a first inductor connected to the primary-side full-bridge power stage, a secondary side comprising switch devices that form a power stage and a second inductor connected to the secondary-side power stage, and a transformer coupling the primary side and the secondary side, the method comprising:
transferring energy from the primary side to the secondary side in a first mode;
transferring energy from the secondary side to the primary side in a second mode; and
in the second mode, switching the switch devices on the primary side and on the secondary side in a defined sequence so as to pre-charge the first inductor and energize the second inductor prior to an energy transfer from the secondary side to the primary side.

12. The method of claim 11, further comprising:
between power transfers from the secondary side to the primary side in the second mode, turning on each switch device of the secondary-side power stage to energize the second inductor and a high-side switch device and a low-side switch device in opposite branches of the primary-side full-bridge power stage at the same time to pre-charge the first inductor at or above a current level that induces little or no voltage overshoot on the switch devices of the secondary-side power stage.

13. The method of claim 12, further comprising:
immediately after pre-charging the first inductor between power transfers from the secondary side to the primary side in the second mode, turning on either each low-side switch device or each high-side switch device in the branches of the primary-side full-bridge power stage at the same time to freewheel the current in the first inductor on the primary side.

14. The method of claim 12, further comprising:
immediately before pre-charging the first inductor between power transfers from the secondary side to the primary side in the second mode, turning on either each low-side switch device or each high-side switch device in the branches of the primary-side full-bridge power stage at the same time to freewheel the current in the first inductor on the primary side.

15. The method of claim 11, wherein in the second mode, the first inductor is pre-charged to an energy level required to charge the output capacitance of each high-side switch device of the primary-side full-bridge power stage prior to first power transfer intervals and to discharge the output capacitance of each low-side switch device of the primary-side full-bridge power stage prior to second power transfer intervals of the opposite polarity as the first power transfer intervals.

16. The method of claim 11, wherein between power transfers from the secondary side to the primary side in the second mode, the first inductor is pre-charged to an energy level which ensures zero-voltage switching of the switch devices at the beginning of the power transfers.

17. A bidirectional phase-shift full bridge converter system, comprising:
a primary side comprising switch devices that form a full-bridge power stage, a first inductor connected to the primary-side full-bridge power stage and a bulk capacitor connected to the primary-side full-bridge power stage;
a secondary side comprising switch devices that form a power stage, and a second inductor connected to the secondary-side power stage;
a transformer coupling the primary side and the secondary side;
a voltage source coupled to the bulk capacitor;
an energy storage device coupled to the secondary side; and
a controller operable to control switching of the switch devices to transfer energy from the voltage source to the secondary side via the transformer to charge the energy storage device in a first mode, and to transfer energy from the energy storage device to the primary side via the transformer to charge the bulk capacitor in a second mode,
wherein in the second mode, the controller is operable to switch the switch devices on the primary side and on the secondary side in a defined sequence to discharge energy from the bulk capacitor to pre-charge the first inductor and to discharge energy from the energy storage device to energize the second inductor prior to an energy transfer from the secondary side to the primary side.

18. The bidirectional phase-shift full bridge converter system of claim 17, wherein in the second mode, the controller is operable to control switching of the switch devices to pre-charge the first inductor for a duration which depends on a value of leakage and stray inductances on the primary side, a current level to which the first inductor is to be pre-charged and a voltage in the bulk capacitor.

19. The bidirectional phase-shift full bridge converter system of claim 17, wherein the primary side further comprises clamping diodes configured to clamp the maximum voltage in the switch devices of the secondary side, and wherein the first inductor provides a lower resistive path than the clamping diodes when pre-charged in the second mode.

20. The bidirectional phase-shift full bridge converter system of claim 17, wherein the secondary side further comprises a snubber circuit configured to reduce voltage overshoot resulting from the switch devices of the secondary side resonating with leakage and stray inductances at the start of a power transfer, and wherein only energy from the leakage and stray inductances which induces the voltage overshoot is dissipated through the snubber circuit in the second mode.

21. The bidirectional phase-shift full bridge converter system of claim 17, wherein each power transfer cycle in the second mode includes a power transfer interval during which energy is transferred from the secondary side to the primary side, a freewheeling interval following the power transfer interval and during which current in the first inductor freewheels on the primary side, and a pre-charge interval following the freewheeling interval, and wherein the controller is operable to turn on each switch device of the secondary-side power stage and a high-side switch device and a low-side switch device in opposite branches of the primary-side full-bridge power stage at the same time during the pre-charge interval to pre-charge the first inductor.

* * * * *